United States Patent [19]

Bartelt et al.

[11] Patent Number: 4,665,352
[45] Date of Patent: May 12, 1987

[54] APPARATUS AND METHOD FOR CONTROLLING AN INDUSTRIAL ROBOT

[75] Inventors: Richard Bartelt, Erlangen; Christof Meier, Heroldsbach, both of Fed. Rep. of Germany

[73] Assignee: Siemens Aktiengesellschaft, Munich, Fed. Rep. of Germany

[21] Appl. No.: 800,982

[22] Filed: Nov. 22, 1985

[30] Foreign Application Priority Data

Dec. 4, 1984 [DE] Fed. Rep. of Germany ....... 3444210

[51] Int. Cl.$^4$ .............................................. G05B 19/42
[52] U.S. Cl. ..................................... 318/568; 364/174
[58] Field of Search ............... 318/568, 568 C, 568 E; 364/174

[56] References Cited

U.S. PATENT DOCUMENTS 4,594,671  6/1986  Sugimoto et al. ................... 364/513

FOREIGN PATENT DOCUMENTS 0120198  1/1984  European Pat. Off. .
2740507  3/1978  Fed. Rep. of Germany .
3244307  5/1984  Fed. Rep. of Germany .

OTHER PUBLICATIONS

Industrie-Anzeiger 106 (1984), No. 23, pp. 31–32.

*Primary Examiner*—William M. Shoop, Jr.
*Assistant Examiner*—Saul M. Bergmann
*Attorney, Agent, or Firm*—Kenyon & Kenyon

[57] ABSTRACT

For reducing the dead time in the control circuit for the track control of an industrial robot (IR), a sensor signal (s) is fed back not at the interpolation clock frequency, but at the faster position control frequency. For this purpose it is necessary to transform the correction vector (c) derived from the sensor signal (s) separately into robot-referred coordinates ($\Delta$, $\alpha$) and to feed it back to the input of the position control. The actualization of arm position dependent transformation parameters ($b_{mn}$) can take place at the interpolation frequency.

7 Claims, 3 Drawing Figures

APPARATUS AND METHOD FOR CONTROLLING AN INDUSTRIAL ROBOT

BACKGROUND OF THE INVENTION

The present invention relates to an apparatus and method for controlling an industrial robot.

In the operation of an industrial robot with several degrees of freedom, it is found increasingly necessary to go, as far as the hand/operating point of its arm is concerned, from a position control to a position regulation, i.e., to feed back sensor data via the hand/operating point, closing the control loop, and not only to set, for instance, axis angles of the industrial robot to preset values. For one, a position control requires expensive mechanical drive designs if high repetition accuracy for programmed motions of the robot arm is to be achieved; secondly, process-dependent track corrections should be possible.

A system according to the generic term for controlling an industrial robot is known, for instance, from DE-OS No. 32 44 307 or from the journal Industrie-Anzeiger 106 (1984) 23, page 31 and is reproduced schematically in FIG. 2 of the present description.

Track points (for instance, Cartesian location vectors x) sequentially predetermined by an interpolation unit IPO in (Cartesian, global) coordinates independent of the robot are transformed at the clock rate of the interpolation IPO (interpolation clock frequency=$f_I$) by a transformation unit T1 into robot-referred coordinates (for instance, axis angles) and fed to a position control L. The clock frequency $f_L$ thereof is several times the interpolation clock frequency $f_I$ in order to provide, within an interpolation cycle, graduated reference settings to the drives of the industrial robot IR and to cause motions of the arm members controlled (for instance, also with respect to velocity and acceleration) of the industrial robot IR. A sensor S picks up the actual or relative position of the hand/operating point HP/AP (position, for instance, relative to a work piece, a welded seam, etc.), and a sensor data processing unit V generates from the sensor signal s a correction vector c which is defined in the robot-independent coordinate system and is fed back, closing the control loop.

In this connection it should be noted that the feedback branch is conducted to a summing point $\epsilon$ at the input of the transformation unit T1 in order to transform the correction vector c implicitly into the robot-referred coordinate system with the respectively next track point x given by the interpolation unit IPO. This type of feedback, however, has the disadvantage inherent in the system, that the hand/operating point control takes into account a change of the sensor signal possibly only after a full interpolation cycle.

SUMMARY OF THE INVENTION

It is therefore an object of the present invention to provide an apparatus and method for regulating an industrial robot, by which a substantially faster implementation of the sensor signal may be assured.

According to the invention, this problem is solved, as far as the apparatus is concerned, by a second transformation unit located in the feedback branch for the transformation of the correction vector defined in a robot-independent coordinate system into a robot-referred correction vector and by feeding back the feedback branch to a summing point at the input of the position control.

With respect to the method, the stated problem is solved, according to the invention, in that the correction vector defined in a robot-independent coordinate system, is generated in several, particularly all position control cycles of an interpolation cycle, is transformed via a second transformation unit into a robot-oriented correction vector and is fed back to a summing point at the input of a position control.

In one embodiment of the method according to the invention, arm position-dependent parameters for the second transformation unit are calculated and made available by a computing unit associated with the first transformation unit.

According to the invention, for the transformation of the correction vector, an approximation method may be used whereby arm-position dependent parameters of the second transformation unit are not actualized in every position control cycle.

The advantage of the apparatus and methods according to the invention is based on the substantially reduced dead time of the sensor signal feedback for the hand/operating point. This dead time is only maximal only for the duration of one or several position control cycles instead of an entire interpolation cycle, which will keep its importance as a system advantage even if increasingly fast interpolation units are available.

The advantage of the approximation method discussed above is in the reduction of the components necessary for the transformation of the correction vector while at the same time preserving the above-mentioned advantages. Worth mentioning here is advantageously the possibility of optimizing between a reduction in outlays (for instance, for relieving a processor) and the control accuracy.

BRIEF DESCRIPTION OF THE DRAWINGS

The invention will be explained in greater detail in the following detailed description with reference to the drawings, in which.

DETAILED DESCRIPTION

Figure 1:
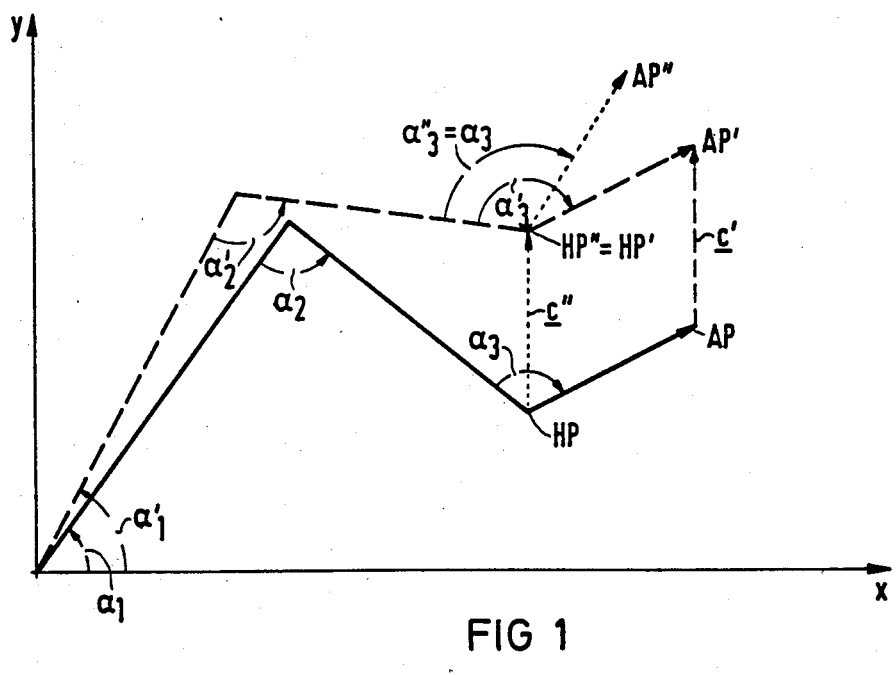
FIG. 1 shows schematically an industrial robot arm in an actual and a reference position.

With reference now to the drawings, the two-dimensional robot model according to FIG. 1 is shown in an actual position (solid line) and in a reference position (dashed line). The base angles $\alpha_1$, $\alpha_2$, of the actual position determine the position of the manual point HP, and the orientation angle $\alpha_3$, the position of the operating point as well as the orientation of the end member of the robot arm. The corresponding quantities of the reference position are each characterized by an added prime. Angle quantities represent robot-referred coordinates; the Cartesian coordinates x, y represent a robot-independent coordinate system.

The operating point AP is to be transferred into position AP' (because, for instance, of a track change due to the process), which can be described by setting in a correction vector c' defined in the rotor-independent coordinate system x, y. This vector must be fed back for the adjustment, according to the setting, of the available degrees of freedom of the robot, into the calculation of the new robot-referred coordinates $\alpha_1$, $\alpha_2$, $\alpha_3$, either before (see FIG. 2) or after (see FIG. 3) the coordinate transformation.

The reference position shown dashed contains not only the transfer of the operating point AP into the position AP' but also the retention of the posture of the end member of the robot arm. For saving transformation and other time/material means, a manual point readjustment can be provided as a substitute, in which the correction vector $c''=c'$ is applied only to the manual point HP without readjusting the orientation of the end member (see HP'', AP'', $\alpha''_3$ and dotted lines). For small track changes, the error caused thereby is of secondary importance, considering the gain, especially in speed.

Figure 2:
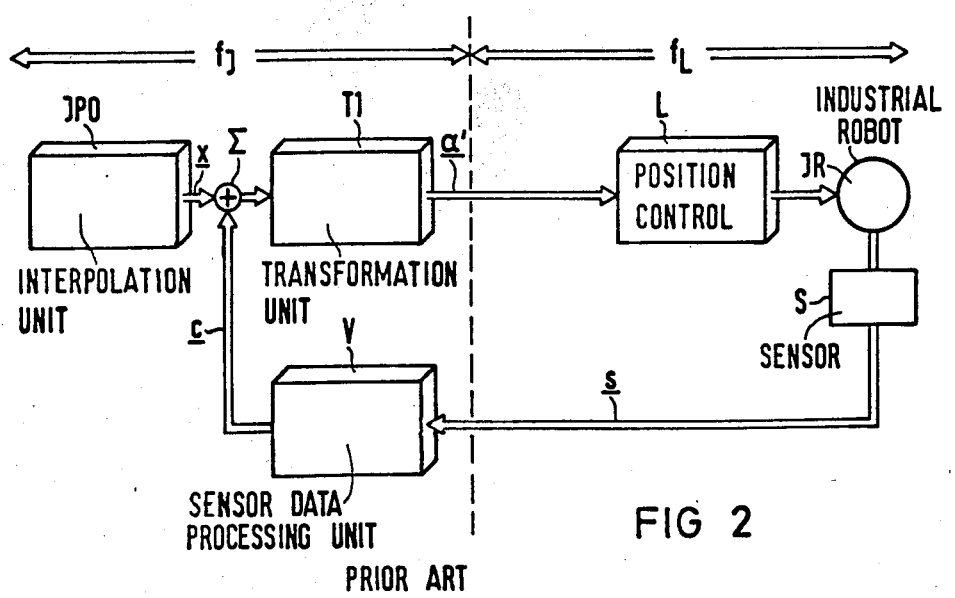
FIG. 2 shows the structure of a conventional track control.
Figure 3:
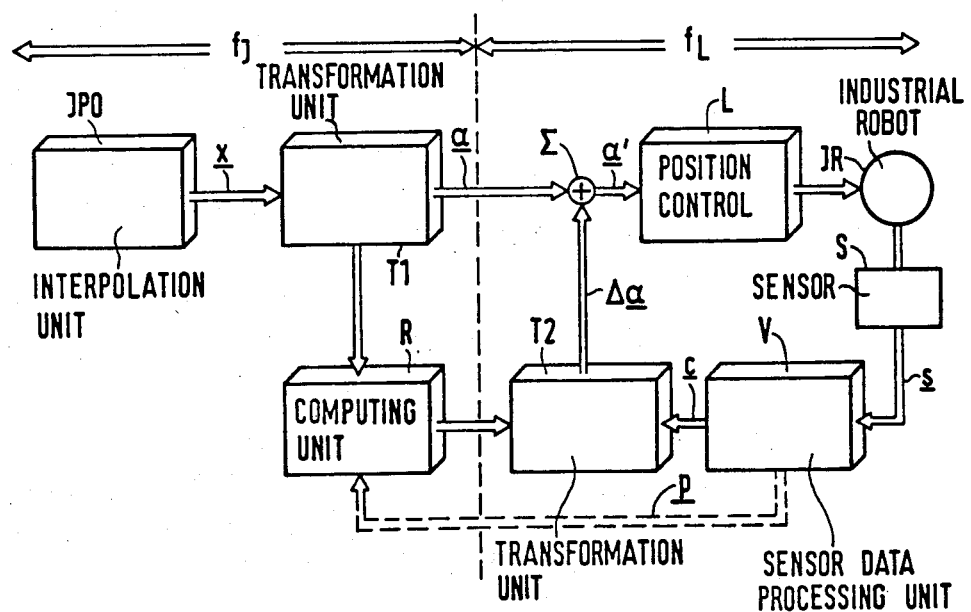
FIG. 3 shows the structure of a track control according to the invention.

The better fulfillment of real-time requirements in the form of substantially reduced control dead times, distinguishes the control structure shown in FIG. 3 from the state of the art which is shown in FIG. 2 and is discussed above in the introduction of the specification.

Into the new control structure according to FIG. 3, a sequence of track points in robot-independent coordinates, for instance, Cartesian location vectors x are preset again by an interpolation unit IPO, sequentially at the clock rate of the interpolation unit IPO (interpolation clock frequency $+f_I$). A first transformation unit T1 transforms every track point x into the robot-referred coordinate system and gives it, for instance, as a vector $\alpha$ of angle reference value for the axes of the industrial robot IR to the position control L via a summing point $\epsilon$. Its clock frequency $f_L$ is several times the interpolation frequency $f_I$ in order to feed, within a respective interpolation period, graduated reference settings to the drives of the industrial robot IR and for instance, also with respect to velocity and acceleration) to cause controlled motions of the arm members of the industrial robot IR.

A sensor S (or a system of sensors) picks up the actual or relative position of the operating point AP (relative position, for instance, of a work piece) and a sensor data processing unit V generates once per position control clock period, a coordinate system from the sensor signal s and optionally from further process data; this correction vector c, which can graphically be interpreted as a correction vector c' from FIG. 1 but is not necessarily identical with the former, since, possibly for reasons of control stability, only a weighting or other processing known from control engineering furnishes the correction vector c which can actually be fed back. It is likewise conceivable that the correction vector c still contains components regarding the spatial orientation of the end member.

This correction vector c which is defined in the robot-independent coordinate system is transformed within the position control clock period in which it was generated, by the second transformation unit T2 into a correction vector—i.e., into robot-referred coordinates and fed back to the summing point at the input of the position control L, closing the control loop, so that corrected robot-oriented reference coordinates $\alpha'$ are present at the input of the position control L.

The transformation of the correction vector c in the second transformation unit T2 is carried out, for instance, as a multiplication of a transformation matrix B by the correction vector c:

$$\underline{\alpha} = \underline{B} \cdot \underline{c}, \text{ i.e., explicitly:}$$

$$\begin{bmatrix} \Delta\alpha_1 \\ \Delta\alpha_2 \\ \Delta\alpha_3 \\ \Delta\alpha_4 \\ \Delta\alpha_5 \\ \Delta\alpha_6 \end{bmatrix} = \begin{bmatrix} b_{11} & b_{12} & b_{13} \\ b_{21} & b_{22} & b_{23} \\ b_{31} & b_{32} & b_{33} \\ b_{41} & b_{42} & b_{43} \\ b_{51} & b_{52} & b_{53} \\ b_{61} & b_{62} & b_{63} \end{bmatrix} \cdot \begin{bmatrix} c_x \\ c_y \\ c_z \end{bmatrix}$$

where $\alpha_1$ to $\alpha_6$ are the angle values of the six axes of an industrial robot IR with six degrees of freedom; $\Delta\alpha_1$, to $\alpha\Delta_6$ are their correction values; $c_x$, $c_y$, and $c_z$ are the Cartesian components of the robot-independent correction vector c; and $b_{11}$ to $b_{63}$ are the coefficients of the transformation matrix B.

The coefficients $b_{mn}$ of the transformation matrix B depend on the arm position of the industrial robot IR and are computed by the computing unit R associated with the first transformation unit T1 from data of the first transformation unit T1 and, if applicable, of the sensor data processing unit B and transferred to the second transformation unit T2. Taking data P of the sensor data processing unit V into consideration is necessary only if relatively large deviations between an originally given track point x and the actual track point P are expected. Otherwise, the originally given track point x can be used with sufficient accuracy as the actual arm position for computing the actual transformation matrix B.

Besides this information regarding the arm position/track point x, the computing unit R obtains from the first transformation unit T1 also information regarding its transformation equations, i.e., those equations which describe the transformation of track points x defined independently of the robot into robot-referred coordinates $\alpha$. As a rule this does not involve linear operations so that a matrix-vector multiplication is not sufficient to describe it and a general transformation operator A is used as an abbreviation for the transformation taking place in the first transformation unit T1 for the further exemplary explanations:

$$\alpha = A\{x\} \quad (*)$$

For instance, for calculating the coefficients $b_{m2}$ (m=1, 2, ..., 6) belonging to a track point x, the transformation equation (*) is applied by the computing unit R to the track point x and subsequently to a track point incrementally shifted in the y-direction. The difference vector $\alpha' - \alpha$ is then the actual second column of the transformation matrix B. The other columns are determined analogously by incremental shifts in the x- or z-direction of the (robot-independent) Cartesian coordinate system.

Alternatively, the determination of the transformation matrix B is possible by differentiation of the transformation equation inverse to (*) (backward transformation)

$$x = A^{-1}\{\alpha\} \quad (**)$$

This will be demonstrated by the simplifying example of purely manual point readjustment: For incremental angle changes $\Delta\alpha_1''$ to $\Delta\alpha_3''$ (combined to form the vector $\Delta\alpha''$), a linear equation system is obtained by partial differentiation of (**); the linear equation system describes the resulting incremental corrections $\Delta x''$, $\Delta y''$, $\Delta z''$ of the robot-independent coordinates of the manual point HP in three-dimensional space (these corrections are combined to form the correction vector $\Delta x''$ and logically correspond to the vector $c''$ from FIG. 1):

$$\Delta x'' = c'' = (B'')^{-1} \cdot \Delta a''.$$

By inversion of the matrix $(B'')^{-1}$, the formulas for the required transformation matrix $B''$ are obtained; the computing unit R calculates the actual value from these formulas and feeds them to the second transformation unit T2.

An approximation method for the control described which greatly reduces the amount in outlays, consists in that the coefficients $b_{mn}$ (m=1, ... 6; n=1, 2, 3) of the transformation matrix B are actualized not in every position control clock period, but only once per interpolation clock period. This provides a dominant advantage, namely, the reduction of the dead time in the control loop untouched, and facilitates its realization without sacrificing the basic accuracy advantage over the solutions of the state of the art. If more stringent accuracy is required, the actualization frequency is increased to maximally the position control clock frequency. An optimization between the reduction in outlays (for instance, relief of the processors or speed gain) and the accuracy is therefore advantageously possible. For actualizing the transformation and control functions described, computers and in particular, digital computers can be used to advantage in many cases.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. Apparatus for controlling an industrial robot, by which the hand or operating point of a robot arm can be guided on a desired track, comprising:
    (a) interpolation means for presetting a sequence of track points in robot-independent coordinates;
    (b) first transformation means for transforming robot-independent coordinates into robot-referred coordinates;
    (c) position control means processing robot-referred coordinates for the positioning of the degrees of freedom of the industrial robot according to the presetting;
    (d) sensor means for picking up the actual or relative position of the hand or operating point;
    (e) sensor data-processing means for generating a correction vector defined in a robot-independent coordinate system;
    (f) a feedback branch for feeding back said correction vector;
    (g) second transformation means located in said feedback branch, for the transformation of the correction vector defined in a robot-independent coordinate system into a robot-referred correction vector; and
    (h) summing means having an input from an output of said first transformation means, an input from an output of said second transformation means and an output coupled to an input of said position control means for coupling a corrected output of said first transformation means to an input of said position control means.

2. The apparatus for controlling an industrial robot recited in claim 1, further comprising a computing means coupled to the first transformation means for computing and making available arm-position dependent parameters for the second transformation means 3. A method for controlling an industrial robot, by which the hand or operating point of a robot arm may be guided on a desired track, comprising the steps of providing a sequence of track points in robot-independent coordinates sequentially and in particular clocked at an interpolation clock frequency; transforming every track point to a position control means responsible for positioning the degrees of freedom of the industrial robot according to the presetting, a control cycle time being a fraction of an interpolation cycle time; obtaining sensor data regarding the actual or relative position of the hand or operating point and processing said data in a sensor data processing means into a correction vector defined in a robot-independent coordinate system; and feeding back said correction vector to said first transformation means, the correction vector being defined in a robot-independent coordinate system, said correction vector being generated in several and particularly all of the position control cycles of an interpolation cycle; said correction vector further being transformed via a second transformation means into a robot-referred correction vector and being fed back to summing means at the input of the position control means.

4. The method for controlling an industrial robot recited in claim 3, wherein arm-position dependent parameters for the second transformation means are calculated and made available by a computing means coupled to the first transformation means.

5. The method for controlling an industrial robot recited in claim 4 wherein the arm position dependent parameters for the second transformation means are generated not in every position control cycle, but in particular, only once per interpolation cycle.

6. The method for controlling an industrial robot recited in claim 4, wherein the transformation of the correction vector defined in a robot-independent coordinate system is carried out in the second transformation means as a multiplication of a transformation matrix with the correction vector defined in the robot-independent coordinate system, the coefficients of said matrix depending on the arm position.

7. The method for controlling an industrial robot recited in claim 6, wherein the transformation matrix for the prevailing arm position is determined by one of:
    (a) difference formation in the first transformation means, where a transformation equation ($a = A\{x\}$) of the first transformation means is considered for the prevailing arm position (x) as well as for an incrementally shifted arm position ($x + \Delta x$); and
    (b) differentiation of the inverse first transformation ($x = A^{-1}\{a\}$) with subsequent inversion and determination of the matrix coefficients by the computing means.

* * * * *